(12) United States Patent
Bostik et al.

(10) Patent No.: US 12,728,987 B2

(45) Date of Patent: Sep. 8, 2026

(54) CAN BUS NETWORK PROTECTION IN REDUNDANT FLY-BY-WIRE SYSTEMS

(71) Applicant: HONEYWELL INTERNATIONAL INC., Charlotte, NC (US)

(72) Inventors: Milan Bostik, Brno (CZ); Frantisek Horniak, Brno (CZ)

(73) Assignee: Honeywell Aerospace US LLC, Phoenix, AZ (US)

( * ) Notice: Subject to any disclaimer, the term of this patent is extended or adjusted under 35 U.S.C. 154(b) by 0 days.

(21) Appl. No.: 19/068,101

(22) Filed: Mar. 3, 2025

(65) Prior Publication Data

US 2026/0257789 A1 Sep. 3, 2026

(51) Int. Cl.

*B64C 13/50* (2006.01)
*B64C 29/00* (2006.01)
*B64D 45/00* (2006.01)

(52) U.S. Cl.

CPC ............ *B64C 13/503* (2013.01); *B64D 45/00* (2013.01); *B64C 29/0016* (2013.01); *B64D 2045/0085* (2013.01)

(58) Field of Classification Search

CPC ... B64C 13/503; B64C 29/0016; B64D 45/00; B64D 2045/0085

See application file for complete search history.

(56) References Cited

U.S. PATENT DOCUMENTS 4,472,780 A * 9/1984 Chenoweth .......... G05D 1/0077 701/4
5,806,805 A * 9/1998 Elbert ..................... B64C 13/42 244/76 A
6,860,452 B2 * 3/2005 Bacon .................. G05D 1/0077 701/4
9,960,452 B2 * 5/2018 Ueno .................. H01M 10/049
11,038,909 B2 6/2021 Juliato et al.
11,097,834 B2 8/2021 Wilkens
11,155,341 B2 * 10/2021 Wilkens ................ B64C 13/505
11,273,906 B2 3/2022 Keir
2011/0251739 A1 * 10/2011 Tomas .................. B64C 13/505 701/3
2017/0355449 A1 * 12/2017 Bapat ...................... B64C 13/04
2019/0036732 A1 * 1/2019 Dormiani .............. B64C 13/503
2020/0031454 A1 * 1/2020 Wilkens ................ B64C 13/505

FOREIGN PATENT DOCUMENTS

CN 103838189 A * 6/2014
CN 111443682 A 7/2020
CN 118353731 A 7/2024

OTHER PUBLICATIONS

Machine Translation of Du's reference (CN-103838189-A) (Year: 2014).*

* cited by examiner

*Primary Examiner* — Tarek Elarabi

(74) *Attorney, Agent, or Firm* — Ingrassia Fisher & Lorenz

(57) ABSTRACT

A system for protecting a controller area network (CAN) aircraft bus from a flight control module failure has been developed. Multiple CAN bus systems serve multiple connected components located onboard an aircraft. Flight control modules located onboard the aircraft are connected to multiple the CAN bus systems. An electronic isolator/repeater that is located between each connection of a flight control module and a CAN bus system. The isolator/repeater serves to isolate the CAN bus system from a failure of the connected flight control module.

16 Claims, 4 Drawing Sheets

CAN BUS NETWORK PROTECTION IN REDUNDANT FLY-BY-WIRE SYSTEMS

TECHNICAL FIELD

The present invention generally relates to aircraft control systems, and more particularly relates to CAN bus network protection in redundant fly-by-wire systems.

BACKGROUND

In some modern aircraft, traditional mechanical flight control systems have been replaced with electrically controlled actuators, often referred to as fly-by-wire. Instead of mechanical linkages between cockpit controls and flight control surfaces, propulsion systems and/or lift systems, electrical signals are utilized to communicate movements of cockpit controls to the controllers associated with the appropriate flight control components or systems. The systems utilize a Controller Area Network (CAN) bus for the flight control computers. Hence, there is a need for CAN bus network protection in redundant fly-by-wire systems.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

A system is provided for protecting a controller area network (CAN) aircraft bus from a flight control module failure. The system comprises: at least one CAN bus system located onboard an aircraft, where each CAN bus system serves multiple connected components; at least one flight control module located onboard the aircraft, where each flight control module is connected to multiple CAN bus systems; and an electronic isolator/repeater that is located between each connection of a flight control module and a CAN bus system, where the isolator/repeater isolates the CAN bus system from a failure of the connected flight control module.

A fly-by-wire system is provided for an aircraft. The fly-by-wire system comprises: three separate CAN bus groups located onboard an aircraft, where each CAN bus group serves multiple connected flight control components; at least three flight control modules located onboard the aircraft, where each flight control module is connected to at least one of CAN bus groups; and electronic isolator/repeaters that are located between each connection of a flight control module and each CAN bus group, where the isolator/repeater isolates the CAN bus group from a failure of the connected flight control module.

Furthermore, other desirable features and characteristics of the disclosed embodiments will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Embodiments of the subject matter described herein relate to electrically-controlled vehicle systems. For purposes of explanation, the subject matter is described herein primarily in the context of aircraft where flight control components are controlled using electrical signals, however, the subject matter is not necessarily limited to use with aircraft and may be implemented in an equivalent manner for other types vehicles (e.g., automotive vehicles, marine vessels, or the like).

A system for protecting a controller area network (CAN) aircraft bus from a flight control module failure has been developed. Multiple CAN bus systems serve multiple connected components located onboard an aircraft. Flight control modules located onboard the aircraft are connected to multiple the CAN bus systems. An electronic isolator/repeater that is located between each connection of a flight control module and a CAN bus system. The isolator/repeater serves to isolate the CAN bus system from a failure of the connected flight control module.

Figure 1:
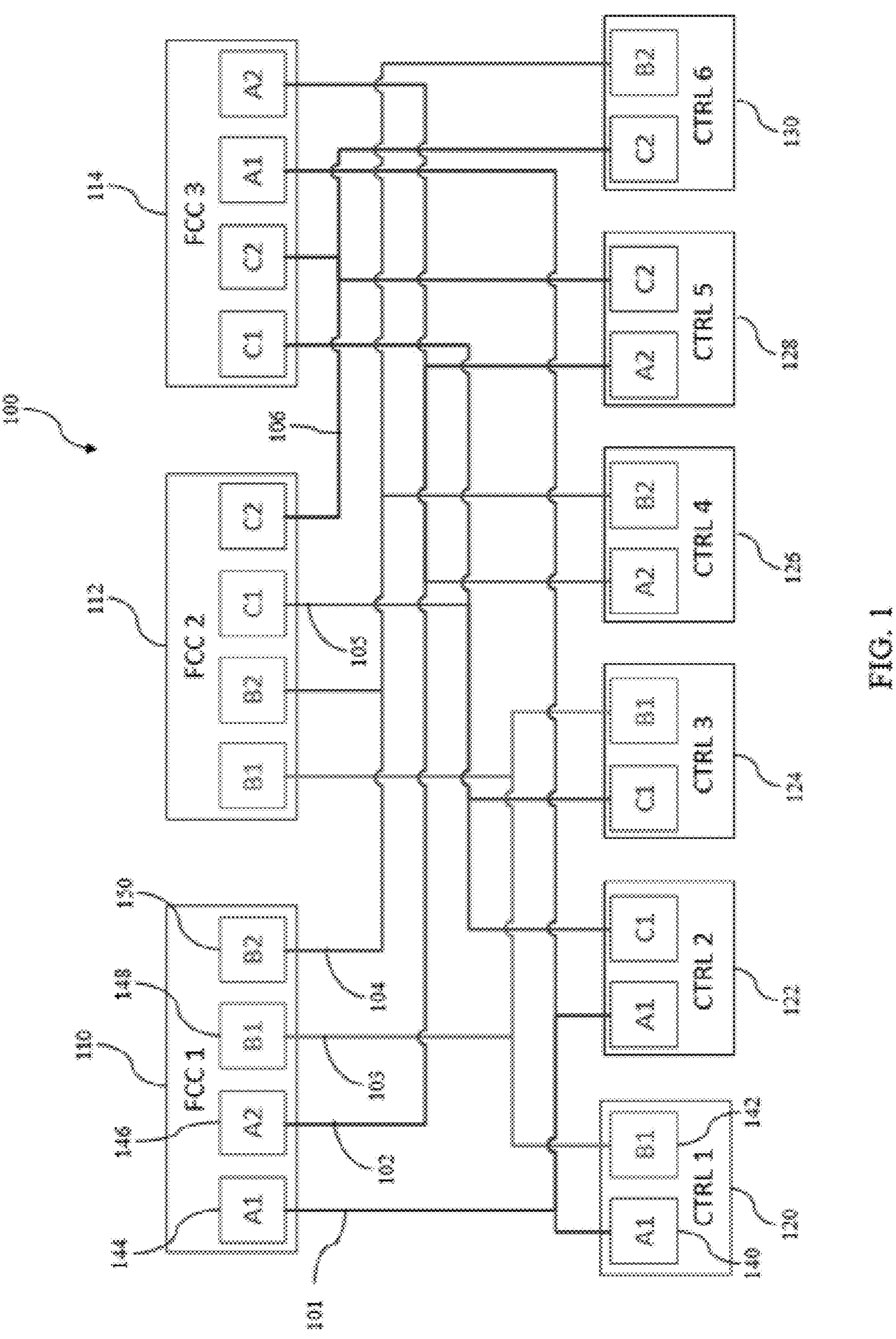
FIG. 1 is a block diagram illustrating a fly-by-wire system suitable for use with an aircraft in accordance with one or more exemplary embodiments.

FIG. 1 depicts an exemplary embodiment of a fly-by-wire system 100 suitable for use with an aircraft. The fly-by-wire system 100 includes a plurality of communications buses 101, 102, 103, 104, 105, 106, a plurality of flight control modules 110, 112, 114, and a plurality of controllers 120, 122, 124, 126, 128, 130 associated with a plurality of flight control components. In the illustrated embodiment, the first flight control module 110 is coupled to a first subset of the buses (e.g., buses 101, 102, 103 and 104), the second flight control module 112 is coupled to a second subset of the buses (e.g., buses 103, 104, 105 and 106), and the third flight control module 114 is coupled to a third subset of the buses (e.g., buses 101, 102, 105 and 106), with each of the subsets of buses being unique, distinct, or otherwise different from one another. In other words, none of the flight control modules 110, 112, 114 are coupled to a common subset of the buses 101, 102, 103, 104, 105, 106, and each of the flight control modules 110, 112, 114 is isolated from at least two of the buses 101, 102, 103, 104, 105, 106 by the absence of a physical electrical connection with the respective isolated bus (e.g., the first flight control module 110 is isolated from the fifth and sixth buses 105, 106, the second flight control module 112 is isolated from the first and second buses 101, 102, and the third flight control module 114 is isolated from the third and fourth buses 103, 104).

It should be noted that although FIG. 1 depicts a fly-by-wire system 100 that includes six buses 101, 102, 103, 104, 105, 106 and three flight control computers 110, 112, 114, it will be appreciated that the subject matter described herein is not necessarily limited to any particular number of buses, flight control computers, or controllers 120, 122, 124, 126, 128, 130. For example, other embodiments may include more than three flight control computers, and/or more than one controller per flight control component, as may be desired to achieve a desired level of redundancy or reliability for a particular application.

In the exemplary embodiments, the controllers 120, 122, 124, 126, 128, 130 manage flight control components which provide lift, propulsion, and/or attitude control for the aircraft, such as, for example, a flight control surface actuator, lift fan, motor, or similar flight control component capable of adjusting or otherwise influencing a position or orientation of the aircraft. In this regard, in one or more embodiments, each controller 120, 122, 124, 126, 128, 130 manages a unique flight control component (or a set of flight control components) that is different from those managed by other controllers 120, 122, 124, 126, 128, 130. That said, other embodiments may employ redundancy where more than one controller 120, 122, 124, 126, 128, 130 is capable of operating a common flight control component. In the exemplary embodiments, each controller 120, 122, 124, 126, 128, 130 is coupled to a distinct or unique subset of the buses 101, 102, 103, 104, 105, 106 relative to the other controllers 120, 122, 124, 126, 128, 130. In one or more embodiments, the buses 101, 102, 103, 104, 105, 106 are logically grouped or paired with one another (e.g., a first pairing of the first bus 101 and the second bus 102, a second pairing of the third bus 103 and the fourth bus 104, and a third pairing of the fifth bus 105 and the sixth bus 106), and none of the controllers 120, 122, 124, 126, 128, 130 are connected to both buses of a respective bus pairing. For example, the first controller 120 may be connected to the first bus 101 and the third bus 103 while the second controller 122 is connected to buses 101 and 105, the third controller 124 is connected to buses 103 and 105, the fourth controller 126 is connected to buses 102 and 104, the fifth controller 128 is connected to buses 102 and 106, and the sixth controller 130 is connected to buses 104 and 106.

In the exemplary embodiments, each of the controllers is coupled to at least two of the flight control modules 110, 112, 114, such that the respective controllers 120, 122, 124, 126, 128, 130 is coupled to each of the flight control modules 110, 112, 114 without triplicate bus connections or interfaces at the controllers 120, 122, 124, 126, 128, 130. At the same time, in the exemplary embodiments where there are six buses 101, 102, 103, 104, 105, 106 in a dual triplex arrangement, each of the controllers 120, 122, 124, 126, 128, 130 is isolated from four of the buses 101, 102, 103, 104, 105, 106 by the absence of a physical electrical connection with the respective isolated buses.

The flight control modules 110, 112, 114 generally represent the processing system, processing device, hardware, circuitry, logic, software, firmware and/or other components configured to receive signals indicative of a sensed or measured position, orientation, or adjustment to user interface devices in the cockpit of the aircraft and convert the inputs or adjustments received at the user interface devices into corresponding command signals for one or more flight control components and output or otherwise provide the command signals to the one or more flight control components via the subset of buses 101, 102, 103, 104, 105, 106 that the respective flight control module 110, 112, 114 is coupled to. For purposes of explanation, the flight control modules 110, 112, 114 may alternatively be referred to herein as flight control computers (FCC). Each flight control computer 110, 112, 114 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 110, 112, 114 may include or access a data storage element (or memory) capable of storing programming instructions for execution that, when read and executed by the flight control computer 110, 112, 114, cause the flight control computer 110, 112, 114 to support operations of the fly-by-wire system 100.

The cockpit user interface devices onboard the aircraft could be realized as a keypad, touchpad, keyboard, mouse, touch panel (or touchscreen), joystick, lever, switch, knob, line select key or another suitable device adapted to receive input from a user. For example, the cockpit user interface devices may be realized as joysticks including respective sets of redundant sensors configured to sense the position of a respective joystick in a first reference direction (e.g., a horizontal or x-reference direction) and additional sets of sensors configured to sense the position of the respective joystick in a second reference direction (e.g., a vertical or y-reference direction), with each sensor of each set being coupled to one of the flight control computers. It should be noted that although the subject matter may be described herein primarily in the context of sensor data associated with pilot inputs or other input received via user interface devices utilized to operate flight control components in fly-by-wire aircraft, the subject matter described herein is not intended to be limited to sensor data or any particular type of sensing arrangement, and may be utilized in the context of other sensors (e.g., inertial reference sensors) or any other type of measurement or command data (e.g., flight plan data) that may be input to a flight control module for purposes of determining flight control component commands. Accordingly, the subject matter may be implemented in an equivalent manner for autonomously or remotely controlled aircraft. One or more exemplary arrangements of cockpit user interface devices, sensors, and flight control computers are described and depicted in U.S. patent application Ser. No. 16/048,612, which is incorporated by reference herein.

One or more avionics systems are also communicatively coupled to each of the flight control computers 110, 112, 114 via a data bus. The avionics systems support navigation, flight planning, and other aircraft control functions in a conventional manner and provide real-time data and/or information regarding the operation of the aircraft to the flight control computers 110, 112, 114 for analysis in conjunction with the sensed user interface device data received from the sensors. Practical embodiments will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. One or more exemplary arrangements of avionics systems and flight control computers are described and depicted in U.S. patent application Ser. No. 16/048,612, which is incorporated by reference herein.

Based on the data or information received from the respective avionics systems and the sensed position or adjustment to a respective user interface device, each of the flight control computers 110, 112, 114 redundantly determines commands for controlling the position of or otherwise operating one or more of the flight control components to adjust the position and/or attitude of the aircraft. The controllers 120, 122, 124, 126, 128, 130 generally represent the processing system, processing device, hardware, circuitry, logic, software, firmware and/or other components of the respective systems 120, 122, 124, 126, 128, 130 that are capable of receiving a command for the respective flight control components and generating corresponding commands for operating the motor or other actuator associated therewith to adjust or otherwise control the respective flight control component to track the commands provided by one or more of the flight control computers 110, 112, 114. In this regard, the controllers may be implemented or realized using any suitable processing system and/or device, such as, for example, one or more processors, central processing units (CPUs), controllers, microprocessors, microcontrollers, processing cores and/or other hardware computing resources configured to support the operation described herein.

In the exemplary embodiments, each of the buses 101, 102, 103, 104, 105, 106 is realized as a Controller Area Network (CAN) bus, with each of the flight control computers 110, 112, 114 and controllers 120, 122, 124, 126, 128, 130 including (or being coupled to a respective CAN bus 101, 102, 103, 104, 105, 106 via) a respective CAN transceiver (or similar communications interface). For example, a first controller 120 may include or be coupled to a first CAN transceiver 140 that is coupled to the first CAN bus 101 and a second CAN transceiver 142 that is coupled to the third CAN bus 103. Similarly, the first flight control computer 110 may include or be coupled to a first CAN transceiver 144 that is coupled to the first CAN bus 101, a second CAN transceiver 146 that is coupled to the second CAN bus 102, a third CAN transceiver 148 that is coupled to the third CAN bus 103, and a fourth CAN transceiver 150 that is coupled to the fourth CAN bus 104. It should be noted that although the subject matter is described herein primarily in the context of CAN buses, the subject matter described herein is not limited to CAN buses and can be implemented in an equivalent manner using other types of communications buses (e.g., avionics full-duplex switched Ethernet (AFDX)), including communication buses or configurations that include more than one transmitter and receiver that share a common physical communication medium.

During operation of the aircraft, each of the flight control computers 110, 112, 114 continually analyzes the outputs of the user interface sensors and the onboard avionics systems to determine corresponding commands for how the respective flight control components should be operated in response to adjustments or changes to the user interface devices substantially in real-time. For each respective flight control component, each of the flight control computers 110, 112, 114 generates a corresponding command that is encoded into a CAN message having a header that identifies the appropriate controller 120, 122, 124, 126, 128, 130 and/or flight control component as the intended recipient for that command, and each of the flight control computers 110, 112, 114 outputs, transmits, or otherwise provides the resultant message to the respective subset of CAN buses 101, 102, 103, 104, 105, 106 that respective flight control computer 110, 112, 114 is connected to. Each of the controllers 120, 122, 124, 126, 128, 130 continually monitors the respective CAN buses 101, 102, 103, 104, 105, 106 it is connected to for messages identifying its associated flight control component as the intended recipient. In response to identifying a message intended for its associated flight control component, the controller 120, 122, 124, 126, 128, 130 decodes, parses, or otherwise analyzes the message to identify the commanded adjustment for its associated flight control component and generates corresponding commands for operating a motor or other actuator to achieve the desired response from the flight control component. In the exemplary embodiments, a cyclic redundancy check (CRC) or similar coding schemes may be utilized to protect against communications errors and improve or ensure the integrity of the messages received by the controllers 120, 122, 124, 126, 128, 130.

The subject matter described herein in the context of FIG. 1 provides independent communication paths that achieve relatively high availability by maintaining support for communications between at least one flight control computer and all of the controllers 120, 122, 124, 126, 128, 130 in the event of an adverse condition or another anomaly or problem with respect to two or more other flight control computers. For example, in an embodiment having three flight control computers, after any one or any two flight control computers experiences problems, the remaining third flight control computer still has the ability to transmit commands to all of the controllers 120, 122, 124, 126, 128, 130. Additionally, a problem with respect to any individual flight control computer or controller cannot adversely degrade all of the CAN buses 101, 102, 103, 104, 105, 106 because no control module is connected to each of the CAN buses 101, 102, 103, 104, 105, 106. In this regard, avoiding fully redundant physical electrical connections between all flight control computers and controllers 120, 122, 124, 126, 128, 130 helps ensure that potential common cause electrical shorts or high voltage faults do not propagate across all CAN buses 101, 102, 103, 104, 105, 106 and/or all flight control computers. Relatively high data integrity may also be achieved using CRCs with CAN messages addressed to individual controllers 120, 122, 124, 126, 128, 130 (in addition to galvanic isolation or other isolation between CAN buses 101, 102, 103, 104, 105, 106). The available bus bandwidth is also improved for aircraft with large numbers of controllers 120, 122, 124, 126, 128, 130 relative to configurations using fewer CAN buses 101, 102, 103, 104, 105, 106.

Figure 2:
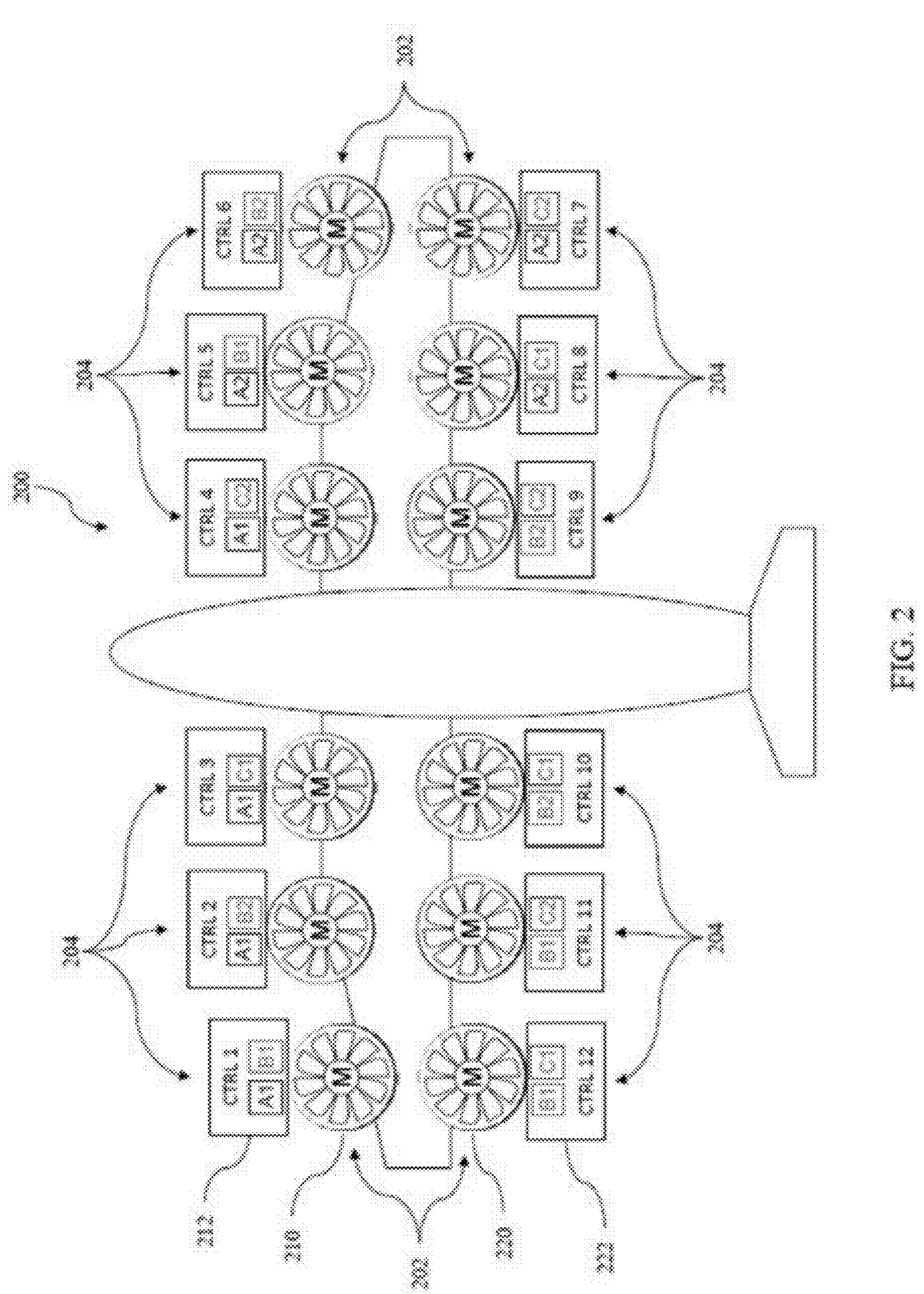
FIG. 2 depicts a vertical take-off and landing (VTOL) aircraft suitable for use with the fly-by-wire system of FIG. 1.

It should be noted that the subject matter described herein also alleviates potential single point fault conditions that could affect multiple CAN buses (e.g., a short circuit between two CAN buses, a controller spamming messages onto the CAN buses it is connected to, etc.) by maintaining increased operational availability in response to a fault condition. In this regard, FIG. 2 depicts a VTOL aircraft 200 having twelve flight control components 202 (e.g., lift fans), with each flight control component 202 having a control system 204 (e.g., one or more motor controllers) that are connected to the flight control computers of the VTOL aircraft 200 (e.g., flight control computers 110, 112, 114) via 6 different CAN buses configured in accordance with the fly-by-wire system 100. For example, the controller for a first lift fan 210 may include a first motor controller 212 that is connected to a first subset of the flight control computers (e.g., flight control computers 110 and 114) via a first CAN bus labeled A1 (e.g., bus 101) and is also connected to a different subset of the flight control computers (e.g., flight control computers 110 and 112) via a different CAN bus labeled B1 (e.g., bus 103), and so on.

Referring to FIG. 2 with continued reference to FIG. 1, by virtue of the dual triplex wiring configuration of the fly-by-wire system 100, there are twelve different combinations or subsets of two of the six CAN buses, such that each lift fan control system can be connected to a unique subset of the six CAN buses relative to the other lift fan control systems. As a result, a fault condition with respect to any two CAN buses only impacts operation of one of the twelve lift fans 202. For example, if a fault concurrently impacts both the B1 and C1 CAN buses (e.g., buses 103 and 105), only one of the lift fans (e.g., lift fan 220 having its motor controller 222 connected to the B1 CAN bus 103 and the C1 CAN bus 105) would be potentially be impaired, while the remaining lift fans 202 would maintain communications with at least one flight control computer via at least one CAN bus. For example, in the event of a loss of availability of the B1 CAN bus 103, the first motor controller 212 of the first lift fan 210 maintains communication with at least two of the flight control computers via the A1 CAN bus 101. Accordingly, the fly-by-wire system 100 of FIG. 1 is advantageous for VTOL aircraft, urban air mobility (UAM) aircraft or other aircraft that may be less resilient to or tolerant of loss of flight control components by limiting the potential loss of control systems to one twelfth of the total number.

For the sake of brevity, conventional techniques related to fly-by-wire systems, avionics systems, avionics standards, avionics installations, communications buses, communications protocols, encoding and/or decoding, formatting, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter. Thus, although FIG. 1 may depict direct electrical connections between components, alternative embodiments may employ intervening circuit elements and/or components while functioning in a substantially similar manner.

Figure 3A:
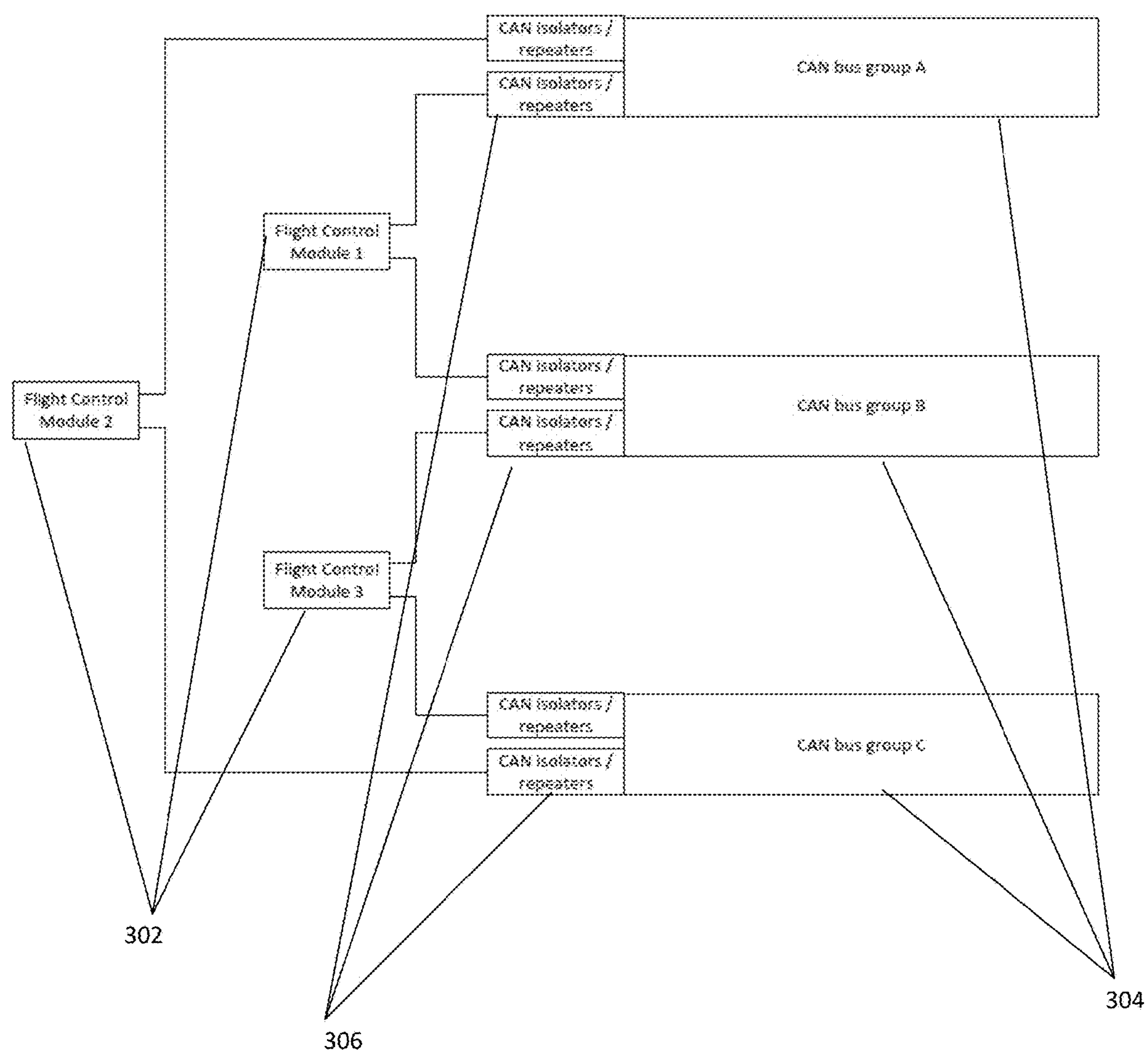
FIG. 3A is a block diagram of a CAN bus network in accordance with one or more exemplary embodiments.

Turning now to FIG. 3A, a block diagram 300 is shown of a CAN bus network in accordance with one or more exemplary embodiments. Multiple flight control modules (1, 2 and 3) 302 are connected to multiple CAN bus groups (A, B and C) 304. Each flight control module 302 is isolated from its respective connected CAN bus groups 304 with a CAN isolator/repeater 306. The CAN isolator/repeaters 306 isolates the CAN bus groups 304 from a failure of the connected flight control modules 302. In this embodiment, CAN isolators/repeaters 306 are located between each flight control module 302 and each CAN bus group 304.

Figure 3B:
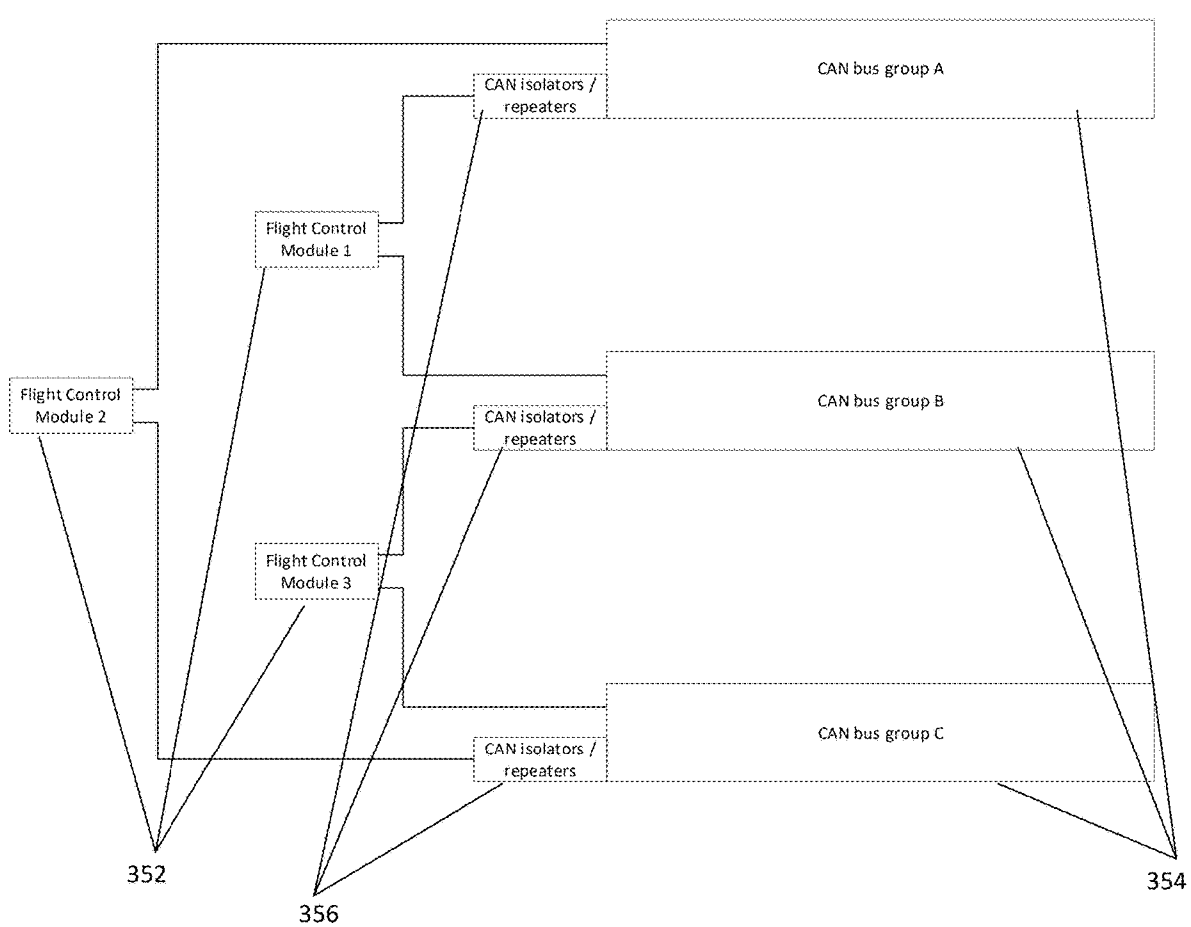
FIG. 3B is a block diagram of an alternative CAN bus network in accordance with one or more exemplary embodiments.

Turning now to FIG. 3B, a block diagram 350 is shown of an alternative CAN bus network in accordance with one or more exemplary embodiments. As with the embodiment shown in FIG. 3A, multiple flight control modules (1, 2 and 3) 352 are connected to multiple CAN bus groups (A, B and C) 354. However, each flight control module 352 is isolated from only one of its two connected CAN bus groups 354 with a CAN isolator/repeater 356 (Module 1 from Bus Group A, Module 2 from Bus Group C, and Module 3 from Bus Group B). As in the previous example, the CAN isolator/repeaters 356 isolates the CAN bus groups 354 from a failure of the connected flight control modules 352. In this embodiment, the loss of any one flight control module could result in loss of only one CAN bus group, but not both CAN bus groups.

Aircraft with vertical take-off and landing capability have higher availability requirements for the actuation sub-system (e.g., lift rotors and associated actuators). The actuation sub-system is typically connected to a minimum of three flight control modules supplying commands via a CAN bus interface to the actuation controllers. The architecture employs three independent CAN bus groups and the actuation controllers are evenly distributed on the CAN buses. Consequently, the availability concern is addressed from the actuation controller perspective since only a limited number of CAN buses can be impacted by a single controller failure. However, a single point failure in any of the flight control modules could still result in loss of unacceptable number of CAN buses which would consequently lead to loss unacceptable number of actuation controllers. The disclosed embodiments solve this availability issue.

The primary advantage of the disclosed embodiments is the isolation of the flight control modules from the aircraft CAN bus network. The CAN isolator/repeater is a relatively simple, small, and inexpensive device that is used as a supplement to the existing system architecture. The disclosed embodiments comprise standalone CAN bus isolators/repeaters directly connected to the flight control modules via CAN bus. The repeaters for each independent CAN bus group would be located further apart to maintain independence between CAN bus groups at the aircraft level. The isolation using the CAN isolators/repeaters ensures that any failure or damage to one flight control module which impacts all of its CAN buses would not prevent other modules from communicating on the CAN bus network. In the event of loss of power to the isolator/repeater, the isolator/repeater input output system (IO) could be connected in order to maintain the communication from the flight control module on the respective CAN buses.

However, this might reduce the max communication rate. Additionally, the CAN isolator/repeater may include a built-in test (BIT) capability to test its ability to release the bus if the flight control component side of the CAN bus is stuck in a dominant state.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

Techniques and technologies may be described herein in terms of functional and/or logical block components, and with reference to symbolic representations of operations, processing tasks, and functions that may be performed by various computing components or devices. Such operations, tasks, and functions are sometimes referred to as being computer-executed, computerized, software-implemented, or computer-implemented. In practice, one or more processor devices can carry out the described operations, tasks, and functions by manipulating electrical signals representing data bits at memory locations in the system memory, as well as other processing of signals. The memory locations where data bits are maintained are physical locations that have particular electrical, magnetic, optical, or organic properties corresponding to the data bits. It should be appreciated that the various block components shown in the figures may be realized by any number of hardware, software, and/or firmware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices.

When implemented in software or firmware, various elements of the systems described herein are essentially the code segments or instructions that perform the various tasks. The program or code segments can be stored in a processor-readable medium or transmitted by a computer data signal embodied in a carrier wave over a transmission medium or communication path. The “computer-readable medium”, “processor-readable medium”, or “machine-readable medium” may include any medium that can store or transfer information. Examples of the processor-readable medium include an electronic circuit, a semiconductor memory device, a ROM, a flash memory, an erasable ROM (EROM), a floppy diskette, a CD-ROM, an optical disk, a hard disk, a fiber optic medium, a radio frequency (RF) link, or the like. The computer data signal may include any signal that can propagate over a transmission medium such as electronic network channels, optical fibers, air, electromagnetic paths, or RF links. The code segments may be downloaded via computer networks such as the Internet, an intranet, a LAN, or the like.

Some of the functional units described in this specification have been referred to as “modules” in order to more particularly emphasize their implementation independence. For example, functionality referred to herein as a module may be implemented wholly, or partially, as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like. Modules may also be implemented in software for execution by various types of processors. An identified module of executable code may, for instance, comprise one or more physical or logical modules of computer instructions that may, for instance, be organized as an object, procedure, or function. Nevertheless, the executables of an identified module need not be physically located together, but may comprise disparate instructions stored in different locations that, when joined logically together, comprise the module and achieve the stated purpose for the module. Indeed, a module of executable code may be a single instruction, or many instructions, and may even be distributed over several different code segments, among different programs, and across several memory devices. Similarly, operational data may be embodied in any suitable form and organized within any suitable type of data structure. The operational data may be collected as a single data set, or may be distributed over different locations including over different storage devices, and may exist, at least partially, merely as electronic signals on a system or network.

In this document, relational terms such as first and second, and the like may be used solely to distinguish one entity or action from another entity or action without necessarily requiring or implying any actual such relationship or order between such entities or actions. Numerical ordinals such as “first,” “second,” “third,” etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as “connect” or “coupled to” used in describing a relationship between different elements do not imply that a direct physical connection must be made between these elements. For example, two elements may be connected to each other physically, electronically, logically, or in any other manner, through one or more additional elements.

As used herein, the term "axial" refers to a direction that is generally parallel to or coincident with an axis of rotation, axis of symmetry, or centerline of a component or components. For example, in a cylinder or disc with a centerline and generally circular ends or opposing faces, the "axial" direction may refer to the direction that generally extends in parallel to the centerline between the opposite ends or faces. In certain instances, the term "axial" may be utilized with respect to components that are not cylindrical (or otherwise radially symmetric). For example, the "axial" direction for a rectangular housing containing a rotating shaft may be viewed as a direction that is generally parallel to or coincident with the rotational axis of the shaft. Furthermore, the term "radially" as used herein may refer to a direction or a relationship of components with respect to a line extending outward from a shared centerline, axis, or similar reference, for example in a plane of a cylinder or disc that is perpendicular to the centerline or axis. In certain instances, components may be viewed as "radially" aligned even though one or both of the components may not be cylindrical (or otherwise radially symmetric). Furthermore, the terms "axial" and "radial" (and any derivatives) may encompass directional relationships that are other than precisely aligned with (e.g., oblique to) the true axial and radial dimensions, provided the relationship is predominantly in the respective nominal axial or radial direction. As used herein, the term "substantially" denotes within 5% to account for manufacturing tolerances. Also, as used herein, the term "about" denotes within 5% to account for manufacturing tolerances.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system for protecting a controller area network (CAN) bus of a fly-by-wire aircraft from a flight control module failure, comprising:

at least one CAN bus system located onboard the aircraft, wherein each CAN bus system serves multiple connected flight control components;

at least one flight control module located onboard the aircraft, wherein each flight control module is connected to multiple CAN bus systems; and an electronic isolator/repeater that is located between each connection of a flight control module and at least one CAN bus system, and includes a built in test (BIT) capability for testing communication ability between the flight control module and the at least one CAN bus system when the flight control module is in a dominant state, wherein the isolator/repeater isolates the CAN bus system from a failure of the connected flight control module.

2. The system of claim 1, wherein each CAN bus system comprises multiple CAN busses.

3. The system of claim 2, wherein the multiple CAN busses are bundled together in a CAN bus group.

4. The system of claim 3, wherein the system comprises three separate CAN bus groups.

5. The system of claim 3, wherein CAN bus groups interface with multiple actuation controllers of the aircraft.

6. The system of claim 5, wherein the multiple actuation controllers are evenly distributed across multiple CAN bus groups.

7. The system of claim 1, wherein the aircraft comprises a vertical takeoff and landing (VTOL) aircraft.

8. The system of claim 1, wherein the aircraft comprises an urban air mobility (UAM) aircraft.

9. The system of claim 1, wherein the flight control module is configured to, determine a command for operating a flight control component;

generate a CAN message addressed with the flight control module for the flight control component; and output the CAN message to the respective connected CAN bus system.

10. The system of claim 9, wherein the flight control component comprises a lift fan of a vertical takeoff and landing (VTOL) aircraft.

11. The system of claim 9, wherein the flight control component comprises a lift fan of a urban air mobility (UAM) aircraft.

12. The system of claim 9, further comprising a user interface device coupled to the flight a control module, wherein the flight control module is configured to determine the command for operating the flight control component based on an adjustment to the user interface device.

13. The system of claim 1, wherein the electronic isolator/repeater includes an input/output (IO) component that maintains a communication connection between the flight control module and the CAN bus system during a power loss event to the electronic isolator/repeater.

14. A fly-by-wire system for an aircraft, comprising:

a three separate CAN bus groups located onboard the aircraft, wherein each CAN bus group serves multiple connected flight control components;

at least three flight control modules located onboard the aircraft, wherein each flight control module is connected to at least one of CAN bus groups; and electronic isolator/repeaters that are located between each connection of a flight control module and at least one CAN bus group, and includes a built in test (BIT) capability for testing communication ability between the flight control module and the at least one CAN bus system when the flight control module is in a dominant state, wherein the isolator/repeater isolates the CAN bus group from a failure of the connected flight control module.

15. The fly-by-wire system of claim 14, wherein the aircraft comprises a vertical takeoff and landing (VTOL) aircraft.

16. The fly-by-wire system of claim 14, wherein the aircraft comprises an urban air mobility (UAM) aircraft.

* * * * *